United States Patent [19]
Johnson et al.

[11] 3,935,818
[45] Feb. 3, 1976

[54] COMBINED FUZE AND GUIDANCE SYSTEM FOR A MISSILE

[75] Inventors: Peter B. Johnson, Washington, D.C.; Edward A. Brown, Silver Spring, Md.

[73] Assignee: The United States of America as represented by the Secretary of the Army, Washington, D.C.

[22] Filed: Aug. 26, 1974

[21] Appl. No.: 500,840

[52] U.S. Cl. .......................... 102/70.2 P; 244/3.16
[51] Int. Cl.² .................. F42C 13/02; F42B 15/02
[58] Field of Search ............ 102/70.2 P; 343/7 PF; 244/3.13, 3.16, 3.19

[56] References Cited
UNITED STATES PATENTS

| | | | |
|---|---|---|---|
| 3,010,677 | 11/1961 | Guthrie et al. | 244/3.16 |
| 3,021,096 | 2/1962 | DeMott | 244/3.16 |
| 3,239,674 | 3/1966 | Aroyan | 102/70.2 P |
| 3,455,243 | 7/1969 | Martin | 102/70.2 P |
| 3,727,553 | 4/1973 | Godfrey | 102/70.2 P |
| 3,877,376 | 4/1975 | Kupelian | 102/70.2 P |

*Primary Examiner*—Charles T. Jordan
*Attorney, Agent, or Firm*—Nathan Edelberg; Robert P. Gibson; Saul Elbaum

[57] ABSTRACT

An active optical fuze for detonating a missile warhead at a prescribed range is disclosed in combination with an optical guidance system target sensing head for a missile which incorporates an assembly of optical elements for receiving radiant energy from a target and wherein the optical axis of the receiving assembly is automatically rotated by guidance controlled means in response to received guidance radiation so as to track the target. A lasing diode is utilized as the fuze radiation transmitting device, the lasing diode being coupled to the receiving optical assembly and disposed coaxially therewith for emitting radiation outwardly along the optical axis of the receiving assembly such that the fuze radiation is automatically emitted in the target direction when the receiving assembly is rotated to track the target. The receiving assembly optics is utilized not only to receive the guidance radiation from the target, but also to receive the fuze transmitter radiations scattered by the target, these two signals being recovered by a signal processing means within the optical receiving assembly.

4 Claims, 2 Drawing Figures

COMBINED FUZE AND GUIDANCE SYSTEM FOR A MISSILE

RIGHTS OF THE GOVERNMENT

The invention described herein may be manufactured, used and licensed by or for the United States Government for governmental purposes without the payment to us of any royalty thereon.

BACKGROUND OF THE INVENTION

This invention generally relates to optical fuzing systems and is particularly concerned with an optical fuzing system which is combined with the guidance system optics within the target sensing head of a guided missile, the optical fuzing system effecting detonation of a missile warhead at a prescribed range.

Automatic guidance of a projectile or missile has been accomplished through numerous different techniques as is well-known in the art, such techniques utilizing a target sensing head of the missile responsive to electromagnetic radiation from a target so as to effect tracking and guidance. The target sensing head of such systems typically incorporates an optical receiving assembly by which the radiation from the target is received and collected. In this respect, it should be appreciated that the term "optical" as employed herein should be construed as being descriptive not only of visible light processing systems, but also as being descriptive of systems for collecting, directing, refracting, transducing, and detecting all forms of electromagnetic radiant energy including both visible/invisible light rays, infrared energy, and radio frequency waves.

The optical guidance system within the target sensing head is employed to detect and determine the position and movement of a target with respect to a given point of observation. Initially, as is typical, the receiving optical assembly of the target sensing head first scans or searches through the field of view so as to detect the desired target. Once the target is so located, the optical receiving assembly generally is gyroscopically driven through servo-systems and other guidance control means which are responsive to the received guidance radiation so as to rotate the optical axis of the receiving assembly and effect tracking of the target.

The thrust of the instant invention is not directed per se to such optical guidance systems, the above information merely being provided as general background. Reference is made to the prior-art literature for specific teachings of conventional guidance systems, such as is disclosed in U.S. Pat. No. 3,239,674, 3,219,294, 3,021,096, 3,133,188, and others, these patent disclosures being herein incorporated by reference.

In cooperation with this missile guidance or tracking function, prior-art systems further utilize fuzing or range-finding techniques such that the missile warhead will be detonated at a prescribed range. It is this aspect of the overall guidance control system to which the instant invention is primarily directed. Typically, prior-art optical fuzing systems are separate from the guidance radiation receiving optics within the target sensing head of a missile, the optical fuze systems typically incorporating a radiation transmitting device which emits radiation outwardly from the missile in the general direction of the target, the fuze transmitter radiation being scattered by the target and subsequently received by a sensing apparatus to derive the requisite range information. When the missile is not directly aligned with the target, the fuze radiation of such prior-art systems would not be emitted in the target direction and, consequently, this requisite fuzing information would temporarily be lost, until the optical guidance system of the missile corrected the missile alignment and direction.

SUMMARY OF THE INVENTION

It is the primary objective of the instant invention to provide an optical fuzing system for a guided missile which is combined with the general optical guidance system within the target sensing head of the missile in a fashion such that the fuze radiation will always be emitted in the target direction, thus insuring proper operation of the fuze system in conjunction with the tracking operation of the optical guidance system of the missile.

This objective, as well as others which will become apparent as the description procedes, are implemented by the subject inventive optical fuzing system which is designed to be utilized in combination with a conventional optical guidance system target sensing head for a missile of the type which incorporates an assembly of optical elements, such as in the form of a reflecting telescope, for receiving radiant energy from a target, and wherein the optical axis of the receiving assembly is automatically rotated by guidance control means in response to received guidance radiation so as to track the target.

Specifically, and in the perferred inventive embodiment, the fuze means of the instant invention incorporates a radiant energy transmitting device, such as a lasing diode, which is coupled to the existing receiving assembly and is disposed coaxially therewith, the radiant energy transmitting device emitting fuze radiation outwardly along the optical axis of the receiving assembly. In this fashion, the fuze radiation is automatically emitted in the target direction when the receiving assembly is rotated to track the target during its conventional operation.

The elements of the existing receiving assembly are also utilized to receive the fuze transmitter radiation which is scattered by the target. To this end, a discriminator means is coupled to the existing receiving assembly along the optical axis and serves to separate the received fuze transmitter radiation from the normally received guidance radiation. Again, in the perferred inventive embodiment, such discriminator means will be seen to comprise a collimating lens and a beam splitter which is disposed on the optical axis of the receiving assembly to separate the fuze radiation signal from the received guidance radiation signal, such separation being possible by constraining the fuze radiation transmitting device to transmit at a different frequency than the frequency of the received guidance radiation. Alternatively, the separation and detection of the received fuze and guidance radiation can be effected by an electronic signal processor which operates on a time-sharing basis.

BRIEF DESCRIPTION OF THE DRAWINGS

The invention will be better understood and further features and advantages thereof will become apparent from the following detailed description of a preferred inventive embodiment, such description making reference to the appended sheets of drawings, wherein FIG. 1 is a schematic representation of a target sensing head incorporating a conventional optical guidance system and optical receiving assembly, in conjunction with the optical fuzing system of the instant invention and utilizing an optical discrimination, and wherein

DETAILED DESCRIPTION OF THE PREFERRED INVENTIVE EMBODIMENT

Figure 1:
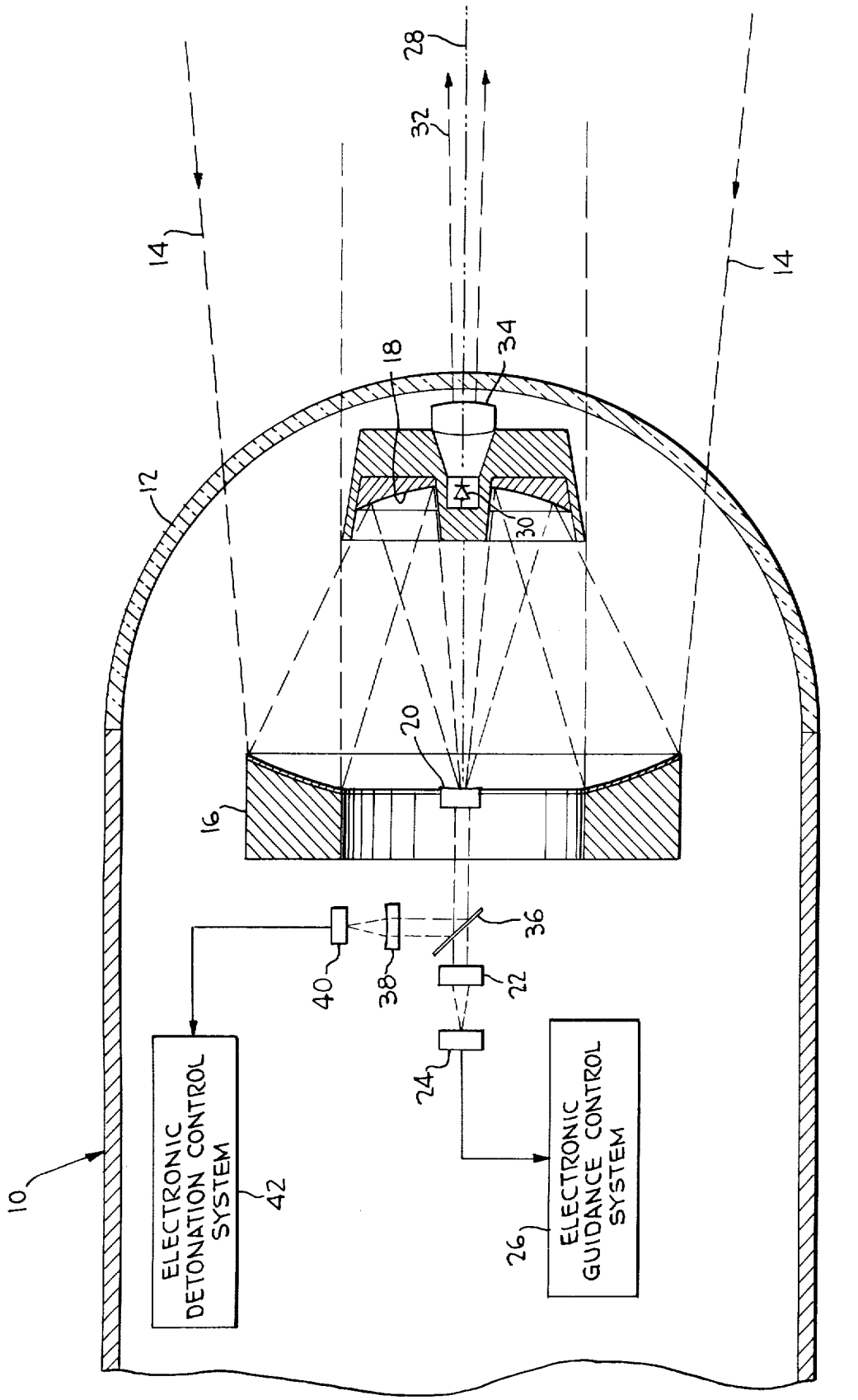

With reference now to FIG. 1, a target sensing head for a typical guided missile or projectile is depicted, the missile generally being designated by reference 10 and incorporating a radome 12 through which electromagnetic radiation is designed to pass. Internally of the target sensing head, an optical guidance system is found, the guidance system incorporating an assembly of optical elements designed to receive radiant energy designated by reference 14 from a target. In the exemplary embodiment of the optical receiving assembly shown, such assembly will be seen to be in the general form of a reflector telescope having a primary mirror 16, a secondary mirror 18, and a collimating lens 20 disposed at the focal point. Thus, received electromagnetic radiation as represented by the lines designated 14 pass through the radome 12, are reflected from the mirrored-surface of primary mirror 16 towards mirror 18, and are then reflected from the mirrored surface of secondary mirror 18 towards the collimating lens 20. This received radiation, which may be infrared in frequency, for example, is then passed through a condensing lens 22 and is detected by a guidance detector 24, the detected signal being utilized by an electronic guidance control system generally designated by reference numeral 26 and of conventional construction as described at the outset so as to effect tracking of the target.

Specifically, and again in accordance with conventional construction, it should be appreciated that the optical receiving assembly comprising primary and secondary mirrors 16 and 18, collimating lens 20, condensor 22, and detector 24 are typically constructed as an integral unit which is capable of being rotated and otherwise moved within the body of missile 10 through gyroscopic control effected by the guidance control system 26. Particularly, it should be appreciated that in accordance with conventional operation, the optical receiving assembly is automatically rotated by the control means 26 in response to received guidance radiation from the target so that the optical axis 28 of the receiving assembly tracks the target, the missile itself subsequently being controlled in conventional fashion in accordance with prior-art techniques. Thus, missile 10, through operation of the guidance control system 26 in cooperation with the depicted optical receiving assembly, can be caused to assume a collision course with a distant target, the optical axis of the receiving assembly automatically being rotated to insure proper tracking.

In addition to the above-described optical guidance system which, as aforestated, is of conventional construction, the instant invention contemplates the provision of an optical fuzing system whereby the missile warhead can be detonated at a prescribed range. To this end, and in accordance with the primary teachings of the invention, a fuze means is provided in combination with the optical guidance system described, and disposed in a fashion such that the optical fuze is automatically pointed at the target by the guidance system at the same time that the optical axis of the receiving assembly is rotated to effect tracking of the target.

Specifically, and in the preferred embodiment as illustrated, the fuze means of the instant invention includes a radiant energy transmitting device, such as a lasing diode 30 which is coupled to the receiving assembly and disposed coaxially therewith, lasing diode 30 emitting radiation 32 outwardly along the optical axis 28 of the receiving assembly. In the embodiment as shown, the fuze transmitter diode is utilized in conjunction with a fuze transmitting lens 34 disposed on the back of secondary mirror 18. With this arrangement, and bearing in mind that the entire optical receiving assembly including secondary mirror 18 is rotated as a unit by the guidance control system 26 so as to track the target, it can be readily appreciated that the fuze radiation 32 will automatically be emitted in the target direction when the receiving assembly is so rotated to track the target. Thus, proper alignment of the fuze transmitting means is always insured, thus obviating a basic disadvantage of prior-art mechanisms.

With the construction as illustrated, it should further be appreciated that much of the existing optical guidance system receiver assembly optics is utilized to receive and collect the fuze transmitter radiation 32 which would be scattered by the target and returned to the missile along with the received guidance radiation designated by reference numeral 14. Thus, the fuze receiver optics likewise are automatically pointed at the target.

The received radiation 14 which, as stated, constitutes both the guidance radiation as well as the fuze transmitter radiation, is then reflected by the primary and secondary mirrors 16 and 18, and is subsequently collimated by the collecting lens 20 as shown. With the combined system as described, means are provided to discriminate and separate the received fuze radiation signal from the received guidance radiation signal. One such means will assume the fuze and guidance systems to operate on radiation of different wave lengths, thus enabling separation of the two signals based on frequency.

For this purpose, the preferred inventive embodiment is illustrated as incorporating a beam splitter 36 disposed on the optical axis 28 of the receiving assembly and operating as an interference filter designed to pass a band of energy in the vicinity of the including the guidance frequency which could comprise reflected laser radiation, for example, and reflect all other energy including the received fuze energy. Thus, the received guidance radiation passes through the beam splitter and condensing lens 22 into the guidance detector 24 as already described. The received fuze radiation is reflected by beam splitter 36 and passes through a further condensing lens 38 into a separate fuze detector 40 which would be a component of an overall electronic detonation control system 42 of conventional construction. If desired, a separate pass-band interference filter at the fuze frequency could be disposed between the beam splitter 36 and the condensing lens 38 as shown, this non-illustrated interference filter serving to reject undesirable competing signals not at the fuze frequency, thus enhancing system operation.

Figure 2:
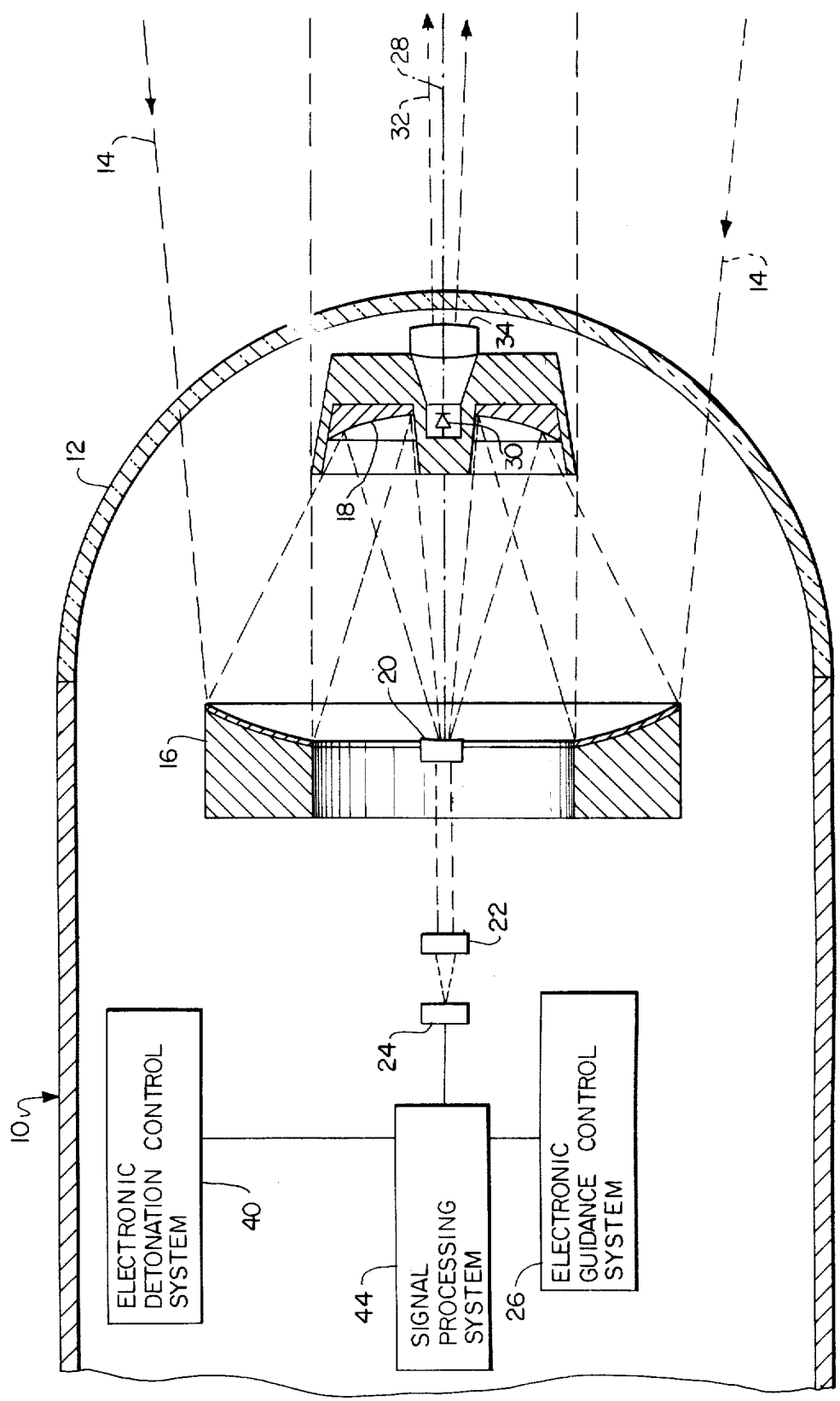
FIG. 2 depicts a further embodiment of the apparatus of FIG. 1 but utilizing an electronic signal processor for the signal discrimination function.

An alternate method of discrimination and separation is depicted in FIG. 2, wherein the received radiation 14 from both fuze and guidance signals is directed as before through collimating lens 20, common condenser 22 and a common detector 24. The signals generated by the detector 24 are conveyed to a signal processing system 44 that functions so as to time-share the receiving optics and detector between the received guidance signal and the received fuzing signal. The time sharing action is based on the premise that both guidance and fuze radiation are pulsatile and of different temporal distribution. This difference in temporal distribution enables the received signals to be discriminated and separated by the signal processing system 44 which then transmits the guidance information to the electronic guidance control system 26 and fuzing information to the electronic detonation control system 42.

It should now be apparent that the objects and advantages of the invention as initially set forth at the outset of the Specification have been successfully achieved. Further, we wish it to be understood that we do not desire to be limited to the exact details of construction shown and described, for obvious modifications can be made by a person skilled in the art.

What is claimed is:

1. In an optical guidance system target sensing head for a missile incorporating an assembly of optical elements for receiving radiant energy from a target, and wherein the optical axis of the receiving assembly is automatically rotated by guidance control means in response to received guidance radiation to track the target, the improvement comprising; an active optical fuze means for detonating a missile warhead at a prescribed range, said fuze means including a radiant energy transmitting device coupled to the receiving assembly and disposed coaxially therewith for emitting radiation outwardly along the optical axis of the receiving assembly, whereby the fuze radiation is automatically emitted in the target direction when the receiving assembly is rotated to track the target; and a discriminator means coupled to the receiving assembly for separating received fuze transmitter radiation scattered by the target from received guidance radiation.

2. The device as defined in claim 1, wherein the receiving assembly is in the form of a gyroscopically driven reflector telescope having axially aligned primary and secondary reflecting mirrors for collecting received radiation, said fuze transmitting device comprising a lasing diode and a transmitting lens coaxially disposed on the back of the secondary mirror, said lasing diode emitting radiation outwardly at a frequency which is different from the frequency of the guidance radiation.

3. The device as defined in claim 2, wherein said discriminator means comprises a collimating lens and a beam splitter disposed on the optical axis of the receiving assembly for receiving radiation reflected by the secondary mirror and for separating the received fuze radiation signal from the received guidance radiation signal, and a separate fuze radiation signal detector for receiving fuze radiation from said beam splitter.

4. The device as defined in claim 2, wherein said discriminator means comprises a common detector coupled to a signal processing means for separating the received fuze radiation signal from the received guidance radiation signal by time sharing.

* * * * *